(No Model.)

H. SCHON.
ROLLER BEARING.

No. 575,618. Patented Jan. 19, 1897.

WITNESSES:
Chas Nida

INVENTOR
H. Schon
BY
Munn &Co
ATTORNEYS.

UNITED STATES PATENT OFFICE.

HUBERT SCHON, OF ALLEGHENY, PENNSYLVANIA.

ROLLER-BEARING.

SPECIFICATION forming part of Letters Patent No. 575,618, dated January 19, 1897.

Application filed April 2, 1895. Serial No. 544,198. (No model.)

*To all whom it may concern:*

Be it known that I, HUBERT SCHON, of Allegheny, in the county of Allegheny and State of Pennsylvania, have invented a new and Improved Roller-Bearing, of which the following is a full, clear, and exact description.

The object of the invention is to provide a new and improved roller-bearing which is simple and durable in construction, very effective in operation, and arranged to reduce the friction to a minimum.

The invention consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
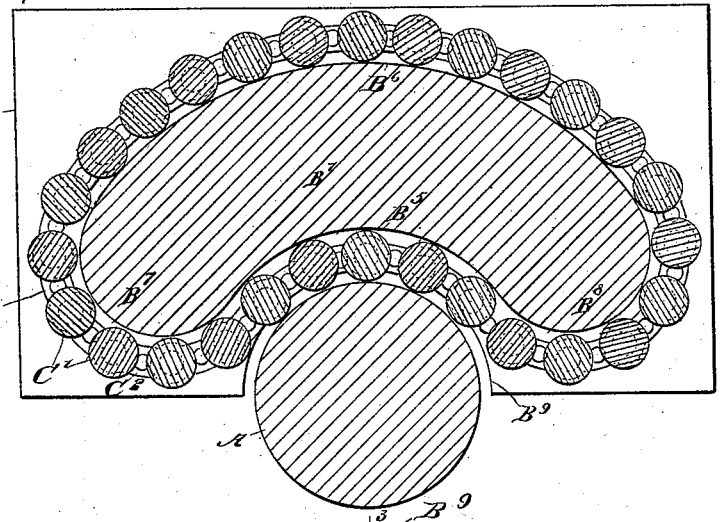
Figure 4:
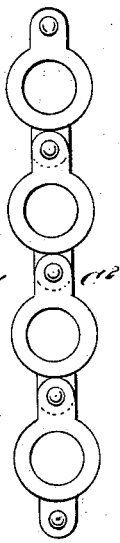
Figure 2:
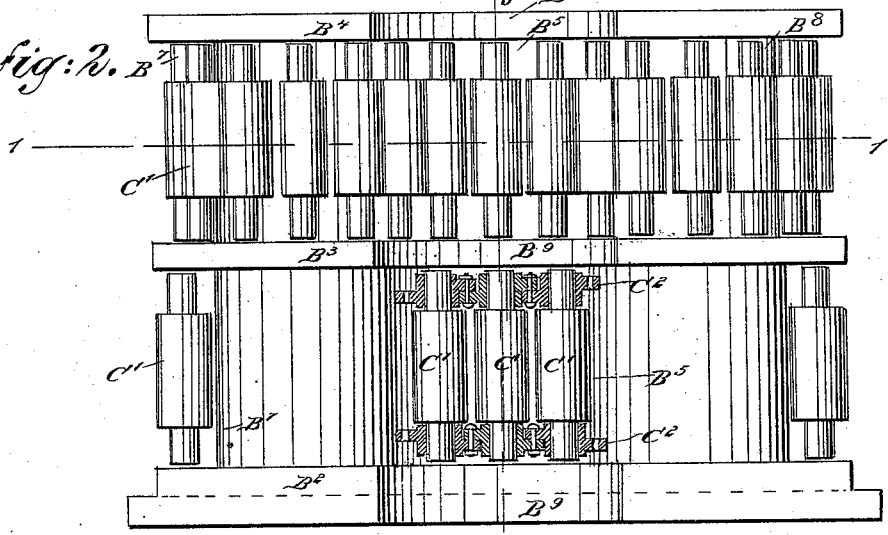
Figure 3:
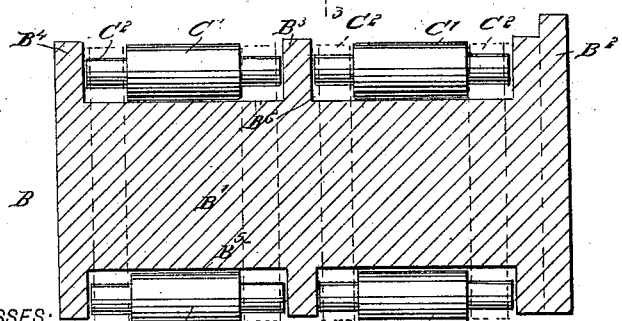

Figure 1 is a sectional side elevation of the improvement on the line 1 1 of Fig. 2. Fig. 2 is an inverted plan view of the box and roller-chain with parts of the latter in section and parts removed. Fig. 3 is a transverse section of the same on the line 3 3 of Fig. 2, and Fig. 4 is a side elevation of part of the chain for the rollers.

The improved roller-bearing, as illustrated in Fig. 1, is shown as applied on an axle A for cars and other vehicles, but it is evident that the roller-bearing may be employed on other devices—for instance, on bicycles, rolling-mills, &c. Between the axle A and the brass or bearing-box B is interposed an endless roller-chain C, comprising a series of rollers $C'$, journaled at their ends in the links of two chains $C^2$, the said links being pivotally connected with each other, so as to render the roller-chain flexible. As shown in Figs. 2 and 3, two such roller-chains may be employed on each brass or bearing-box B, but only a single roller-chain or three or more such chains may be employed between the axle and the box B.

As shown in the drawings, the brass or bearing-box B is provided with a bearing part $B'$ and the flanges $B^2$, $B^3$, and $B^4$, between which the two roller-chains are located, as indicated in Figs. 2 and 3. The bearing part $B'$ is provided at its under side with the curved surface $B^5$, concentric to the periphery of the axle A, and the said bearing part $B'$ has its top $B^6$ likewise concentric to the periphery of the axle and the surface $B^5$, as shown in Fig. 1. The ends $B^7$ and $B^8$ of the bearing part $B'$ are rounded, so that the roller-chains C can readily travel on the said surfaces $B^5$ and $B^6$ and rounded ends $B^7$ and $B^8$, it being understood that the aggregate length of the bearing-surface of the part $B'$ is equal to the interior circumference or length of the endless roller-chains C. The links $C^2$ forming the chains C are less in height than the diameters of the rollers $C'$, so that the peripheral surfaces of the latter only come in contact with the bearing-surface on the part $B'$ and the top surface of the axle A.

Each roller $C'$ is preferably journaled at its reduced ends at or near the middle part of corresponding links of the chain $C^2$, and two adjustable links are pivotally connected with each other midway between two adjustable rolls.

The under sides of the flanges $B^2$, $B^3$, and $B^4$ are cut out, as at $B^9$, concentric to the peripheral surface of the axle A, without, however, touching the same, as indicated in Fig. 1. The flanges $B^2$, $B^3$, and $B^4$ serve to prevent lateral shifting of the roller-chains and at the same time serve to fasten the bearing-box in position on a truck or other part on which the roller-bearing is applied.

As indicated in Figs. 1 and 3, the flanges project beyond the top surfaces of the rollers $C'$, so that the latter do not come in contact with any of the parts on which the box is fastened.

It will be seen that when the device is in use and the axle A rotates a traveling motion is given to the roller-chains, so that the rollers $C'$ roll off between the peripheral surface of the axle A and the bearing-surface $B^5$, whereby the friction is greatly reduced, and rollers $C'$ may be employed, of a comparatively soft material. It is, however, understood that steel rollers are preferably employed.

Having thus fully described my invention, I claim as new and desire to secure by Letters Patent—

A roller-bearing comprising an axle and a bearing-box having a continuous bearing-surface, and a roller-chain engaging the said bearing-surface, the bearing-box being provided with flanges whose main portions project outwardly beyond the rollers, while adjacent to the axle the flanges are of reduced length to allow the rollers to project beyond the flanges to engage the axle, substantially as described.

HUBERT SCHON.

Witnesses:
W. J. BECKFELD,
HENRY FREY.